US011351931B2

(12) United States Patent
Mutyala et al.

(10) Patent No.: US 11,351,931 B2
(45) Date of Patent: *Jun. 7, 2022

(54) DRIVER ASSIST SYSTEM FOR A VEHICLE

(71) Applicant: ZF FRIEDRICHSHAFEN AG, Friedrichshafen (DE)

(72) Inventors: Sri Mutyala, Farmington Hills, MI (US); Darryl Edwards, Novi, MI (US); Kevin Maddalena, Westland, MI (US); Larry Schester, Canton, MI (US); Harsh Shah, Southfield, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,955

(22) Filed: Dec. 2, 2020

(65) Prior Publication Data

US 2021/0146853 A1 May 20, 2021

Related U.S. Application Data

(62) Division of application No. 16/683,587, filed on Nov. 14, 2019, now Pat. No. 10,981,520.

(51) Int. Cl.
*B60R 11/04* (2006.01)
*H04N 5/225* (2006.01)

(52) U.S. Cl.
CPC ........... *B60R 11/04* (2013.01); *H04N 5/2254* (2013.01); *H04N 5/22521* (2018.08)

(58) Field of Classification Search
CPC ........... B60R 11/04; B60R 2011/0026; H04N 5/22521; H04N 5/2254; B60S 1/023
See application file for complete search history.

(56) References Cited

U.S. PATENT DOCUMENTS

| 10,288,986 B2 | 5/2019 | Blake, III et al. |
| 10,380,432 B2 | 8/2019 | Murao |
| 2014/0160284 A1 | 6/2014 | Achenbach et al. |
| 2016/0006911 A1 | 1/2016 | Kimura et al. |
| 2016/0119509 A1 | 4/2016 | Wato |
| 2016/0174408 A1 | 6/2016 | Tolbert et al. |
| 2018/0259830 A1 | 9/2018 | Schmidt |

*Primary Examiner* — Michael E Teitelbaum
(74) *Attorney, Agent, or Firm* — Tarolli, Sundheim, Covell & Tummino LLP (57) ABSTRACT

A driver assist system for a vehicle includes a bracket connectable with a vehicle window. The bracket has a body portion and a camera viewing window in the body portion. A camera in the body portion has a field of view through the camera viewing window. A heat sink contacts the camera and is configured to contact the vehicle window. The heat sink extends about a periphery of the camera viewing window so that heat generated by the camera is transferred through the heat sink to an area of the vehicle window that surrounds the camera's field of view.

16 Claims, 4 Drawing Sheets

DRIVER ASSIST SYSTEM FOR A VEHICLE

RELATED APPLICATION

This application is a Divisional of U.S. patent application Ser. No. 16/683,587, filed Nov. 14, 2019, the entirety of which is hereby incorporated by reference for all purposes.

FIELD OF THE INVENTION

The present invention is directed to a driver assist system for a vehicle and, in particular, to a vehicle driver assist system having a heat sink for defogging and/or de-icing a vehicle window.

BACKGROUND OF THE INVENTION

A driver assist system ("DAS") for vehicles is known. One type of vehicle DAS uses a forward facing camera. The camera is mounted in a housing that is secured to the front windshield of the vehicle to provide a forward looking field of view in front of the vehicle. Such forward facing vehicle DAS arrangements monitor the vehicle's forward operating environment and provide other vehicle systems with the monitored environment information to aid in a safer operation of the vehicle. For example, the vehicle DAS can monitor lane departure, assist in maintaining a vehicle in a road lane, provide lane centering/guidance, control operation of the high and/or low beam headlights, detect vehicle presence, provide forward crash warning, perform sign recognition, and/or apply automatic emergency braking in response to the detection of a pedestrian.

A vehicle DAS controller is connected to an output of the camera and analyzes image output data from the camera. Fog and/or ice on the windshield can cause degradation of the quality of the camera image. To ensure that the camera of the vehicle DAS accurately perceives the environment within its field of view, it is desirable to reduce any fog and/or ice on the windshield that could affect the camera image, which may result in an improper image analysis.

SUMMARY OF THE INVENTION

According to one aspect, a driver assist system for a vehicle comprises a bracket connectable with a vehicle window. The bracket has a body portion and a camera viewing window in the body portion. A camera in the body portion has a field of view through the camera viewing window. A heat sink contacts the camera and is configured to contact the vehicle window. The heat sink extends about a periphery of the camera viewing window so that heat generated by the camera is transferred through the heat sink to an area of the vehicle window that surrounds the camera's field of view.

According to another aspect, alone or in combination with any other aspect, the heat sink can include a thermally conductive body having a first conductive body portion that extends about the periphery of the camera viewing window. The heat sink can include a first resiliently compressible thermal interface material on the first conductive body portion. The first thermal interface material can be configured to contact the vehicle window and provide an interface between the first conductive body portion and the vehicle window.

According to another aspect, alone or in combination with any other aspect, the thermally conductive body can have a second conductive body portion adjacent to the camera. The heat sink can include a second resiliently compressible thermal interface material on the second conductive body portion. The second thermal interface material can contact the second conductive body portion and provide an interface between the camera and the second conductive body portion.

According to another aspect, alone or in combination with any other aspect, the thermally conductive body can have an intermediate conductive body portion that extends through the body portion of the bracket. The intermediate conductive body portion can interconnect the first and second conductive body portions so that heat generated by the camera is conducted to the vehicle window through the second conductive body portion, the intermediate conductive body portion and the first conductive body portion.

According to another aspect, alone or in combination with any other aspect, the heat sink can include a first resiliently compressible thermal interface material between and contacting a first portion of the heat sink and the vehicle window. The heat sink can include a second resiliently compressible thermal interface material between and contacting a second portion of the heat sink and the camera.

According to another aspect, alone or in combination with any other aspect, the body portion can have a mounting face configured to face the vehicle window. The camera viewing window can be defined by spaced apart first and second sidewalls that extend from the mounting face and a bottom wall that interconnects the sidewalls. The heat sink can include a window portion configured to contact the vehicle window. The window portion can have spaced apart first and second side segments and an end segment that interconnects the first and second side segments. The first side segment can engage the first sidewall. The second side segment can engage the second sidewall. The end segment can be spaced apart from the camera.

According to another aspect, alone or in combination with any other aspect, the camera viewing window can be further defined by an end wall that extends from the mounting face away from the vehicle window when the bracket is connected to the vehicle window. The end wall can be spaced from the camera and can interconnect the first and second sidewalls. The end segment of the windshield portion can engage the end wall.

According to another aspect, alone or in combination with any other aspect, the body portion can have a mounting face configured to face the vehicle window. The mounting face can have a groove thereon. The groove can extend about the periphery of the camera viewing window. A portion of the heat sink can be in the groove.

According to another aspect, alone or in combination with any other aspect, the camera viewing window can be defined by spaced apart first and second sidewalls that extend from the mounting face and a bottom wall that interconnects the sidewalls. The groove can have a first side portion formed in the first sidewall, a second side portion formed in the second sidewall, and an end portion that interconnects the first and second side portions. A portion of the heat sink can be in the first side, second side and end portions of the groove.

According to another aspect, alone or in combination with any other aspect, the camera viewing window can be further defined by an end wall that extends from the mounting face away from the vehicle window when the bracket is connected to the vehicle window. The end wall can be spaced from the camera and can interconnect the first and second sidewalls. The end portion of the groove can formed in the end wall.

According to another aspect, alone or in combination with any other aspect, the heat sink can include a window portion in the groove and extending about the periphery of the camera viewing window. The window portion can have a first side segment in the first side portion of the groove, a second side segment in the second side portion of the groove, and an end segment in the end portion of the groove. The end segment of the window portion can interconnect the first and second side segments.

According to another aspect, alone or in combination with any other aspect, the body portion can have a mounting face configured to face the vehicle window. The body portion can define a camera receiving portion below the mounting face in which the camera is provided. The heat sink can include a camera portion contacting the camera in the camera receiving portion and a window portion configured to contact the vehicle window. The window portion can extend about the periphery of the camera viewing window on the mounting face.

According to another aspect, alone or in combination with any other aspect, the heat sink can have an intermediate portion extending through the body portion between the camera receiving portion and the mounting face. The intermediate portion of the heat sink can interconnect the camera and window portions so that heat generated by the camera is conducted to the vehicle window through the camera portion, the intermediate portion and the window portion of the heat sink.

According to another aspect, alone or in combination with any other aspect, the camera portion can conduct heat from the camera to the intermediate portion. The window portion can conduct heat from the intermediate portion to the vehicle window.

According to another aspect, alone or in combination with any other aspect, the driver assist system can further comprise a thermal insulator in the camera receiving portion. The thermal insulator can be positioned between and contacting the camera and portions of the body portion that define the camera receiving portion. The thermal insulator can direct heat generated by the camera toward the camera portion of the heat sink by insulating the camera receiving portion and limiting and/or preventing the loss of heat to the surrounding environment.

According to another aspect, alone or in combination with any other aspect, the body portion can define a camera receiving portion in which the camera is provided. The camera can have a lens that extends into the camera viewing window.

According to another aspect, alone or in combination with any other aspect, the driver assist system can further comprise a thermal insulator in the camera receiving portion. The thermal insulator can be positioned between and contacting the camera and portions of the body portion that define the camera receiving portion. The thermal insulator can insulate the camera receiving portion to limit and/or prevent the loss of heat generated by the camera to the surrounding environment.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
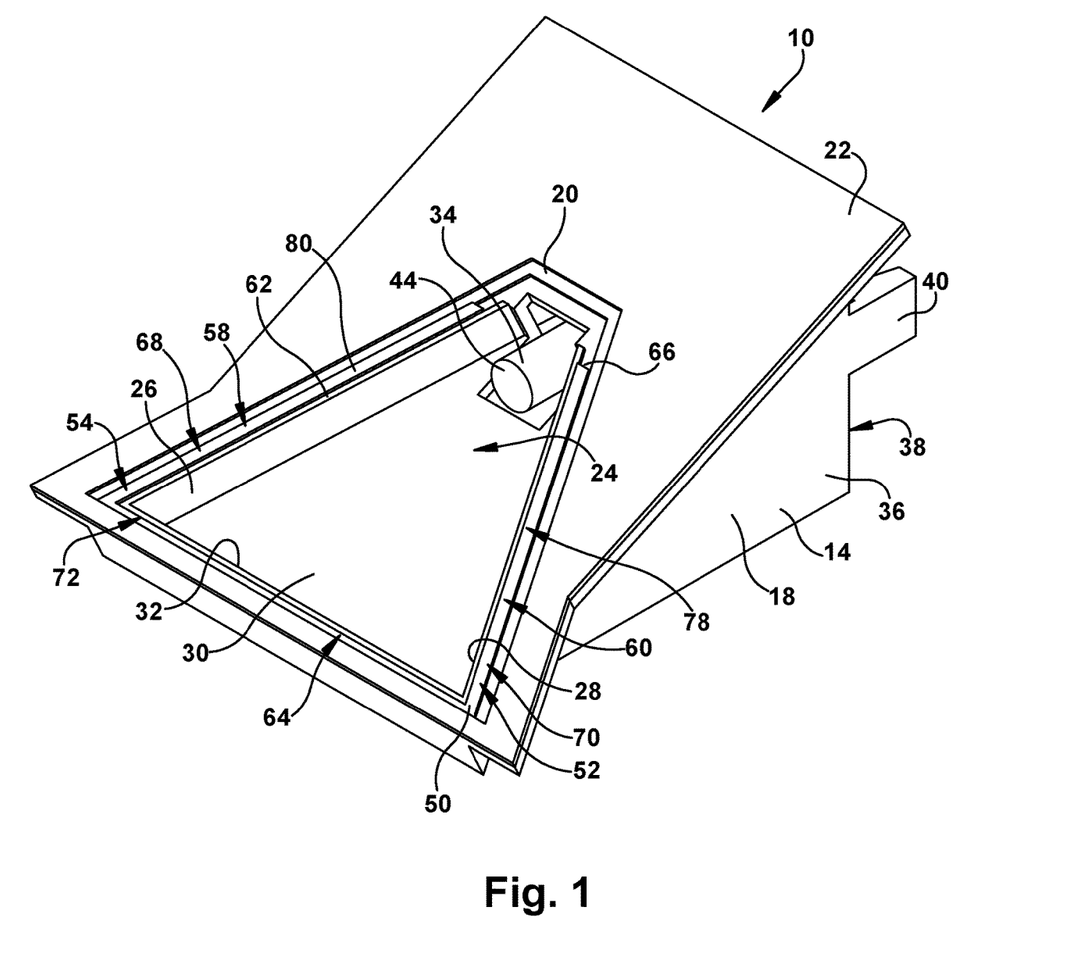
FIG. 1 is a perspective view of a driver assist system made in accordance with one embodiment of the present invention.
Figure 2:
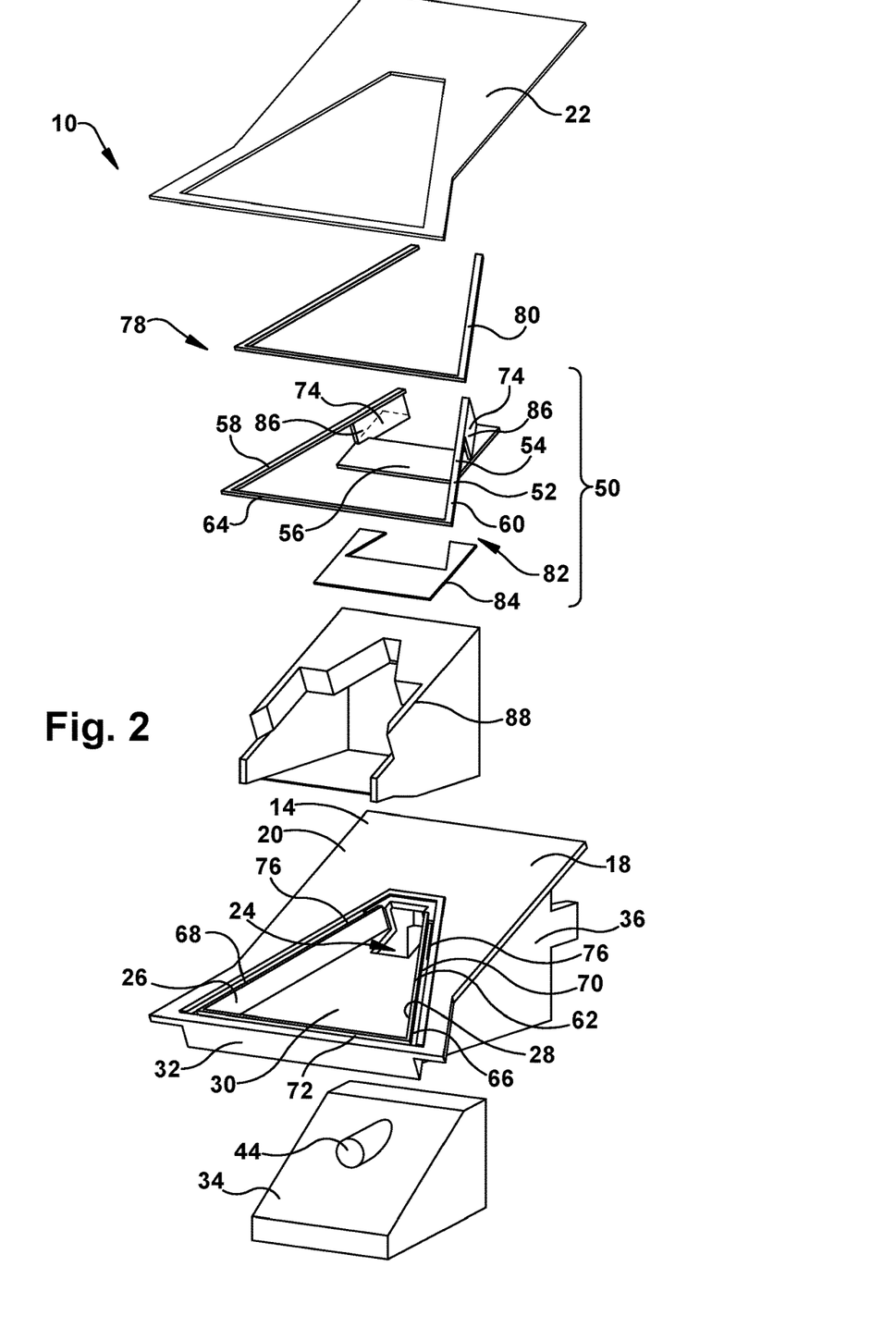
FIG. 2 is an exploded view of the driver assist system of FIG. 1.
Figure 3:
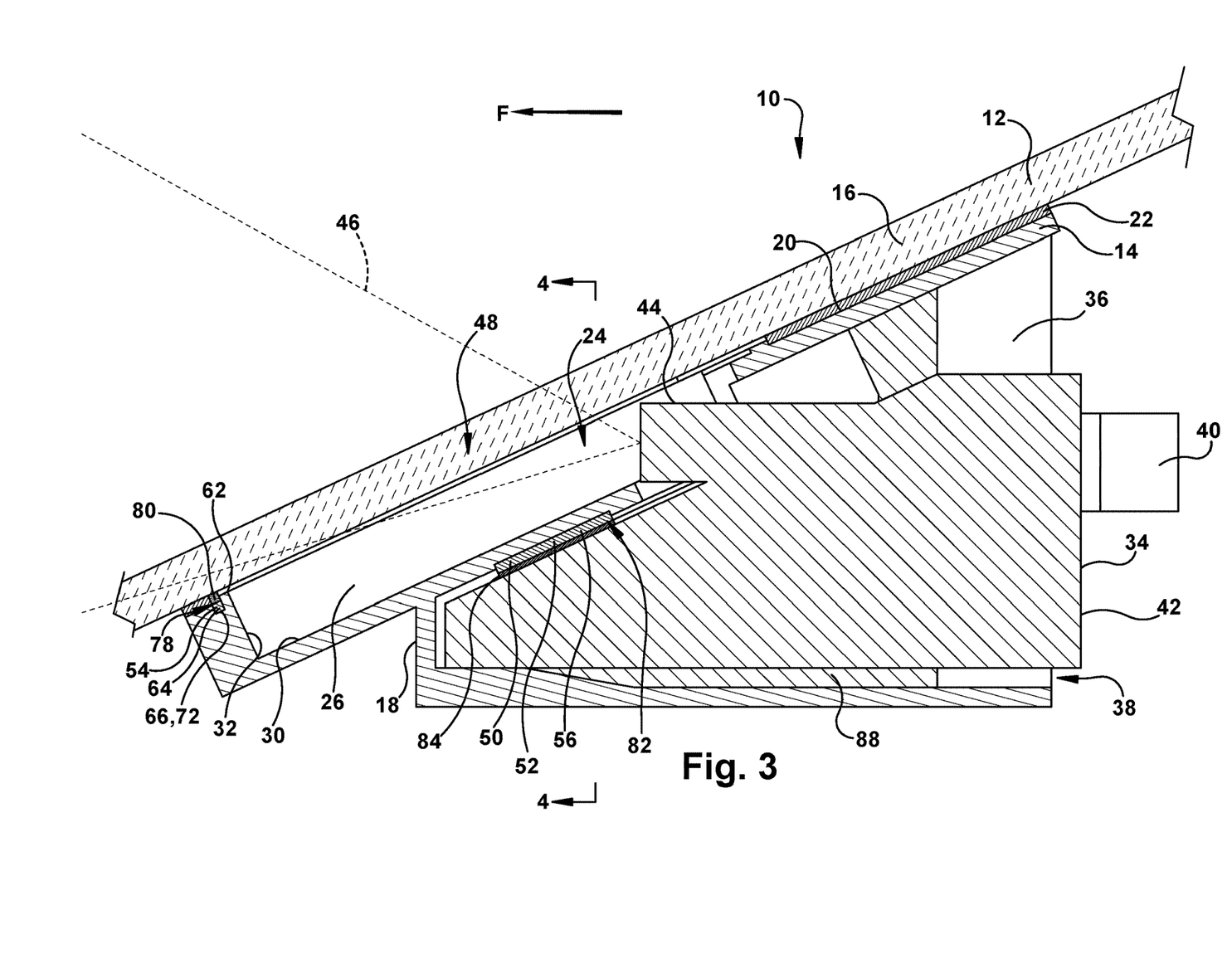
FIG. 3 is a sectional view of the driver assist system of FIG. 1 shown secured to a vehicle window.
Figure 4:
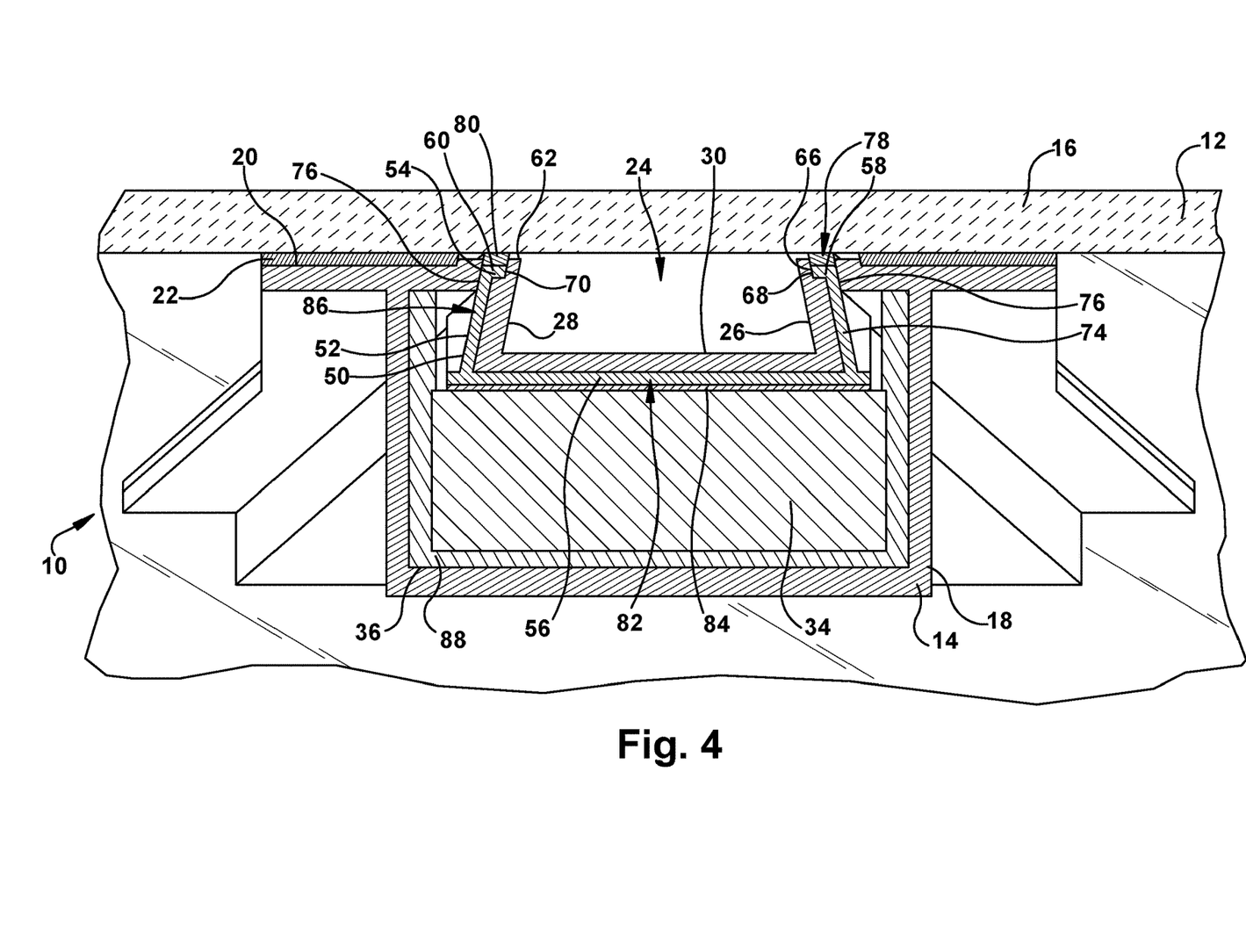
FIG. 4 is a sectional view of the driver assist system of FIG. 1 shown secured to a vehicle window.

FIGS. 1-4 illustrate a driver assist system ("DAS") 10 for a vehicle 12. The DAS 10 includes a bracket 14 connectable with a vehicle window 16, such as a windshield, side window, or rear window of the vehicle 12. In the example configuration of FIGS. 1-4, the bracket 14 is shown as being connected to a windshield 16 of the vehicle 12. The bracket 14 has a body portion 18 having a mounting face 20. The mounting face 20 is configured to face the windshield 16 when the bracket 14 is mounted or secured to the windshield. The mounting face 20, as shown in FIGS. 3-4, can be directly mounted to the windshield 16 via a layer of adhesive 22.

As shown in FIGS. 1-4, a camera viewing window 24 is provided on the mounting face 20. The camera viewing window 24 is defined by spaced apart first and second sidewalls 26, 28 and a bottom wall 30. The first and second sidewalls 26, 28 extend from the mounting face 20 away from the windshield 16 when the bracket 14 is connected to the windshield. The bottom wall 30 extends between and interconnects the first and second sidewalls 26, 28. The camera viewing window 24 can further be defined by an end wall 32 that extends from the mounting face 20 away from the windshield 16 when the bracket 14 is connected to the windshield. The end wall 32 extends between and interconnects the first and second sidewalls 26, 28 and the bottom wall 30.

A camera 34, such as a CCD or CMOS camera, is in the body portion 18 of the bracket 14. The body portion 18 of the bracket 14 may have any construction or configuration suitable to contain or support the camera 34. As shown in the example configuration of FIGS. 3-4, the body portion 18 defines a camera receiving portion 36 below the mounting face 20. The camera 34 can be positioned in the camera receiving portion 36 through a camera receiving opening 38 in the body portion 18. The body portion 18 of the bracket 14 can have resilient arms 40 adjacent to the camera receiving opening 38 that engage an end 42 of the inserted camera 34 to maintain the camera in the camera receiving portion 36.

The camera 34 has a lens 44 that extends into the camera viewing window 24 when attached to the bracket 14. When attached to the windshield 16 of the vehicle 12 using the bracket 14, as shown in FIG. 3, the camera 34 has an unobstructed field of view ("FOV") 46 through the camera viewing window 24 in a vehicle forward direction, as indicated by an arrow F in FIG. 3. Although the embodiment of FIGS. 1-4 is described with reference to a DAS having a forward looking camera arrangement, the DAS may have a different field of view (e.g., a rearward facing camera arrangement, a side-ward facing camera arrangement, or a vehicle interior facing camera arrangement).

Under certain environmental conditions, fog and/or ice can form on the windshield 16. When fog and/or ice develops on the windshield 16 in an area that intersects the camera's FOV 46, the camera's FOV can be obstructed and/or the quality of the image obtained by the camera 34 can be reduced. To prevent fog and/or ice from developing on the windshield 16 at the windshield/FOV intersection 48, and/or to remove fog and/or ice that has developed on the windshield at the windshield/FOV intersection, the DAS 10 includes a heat sink 50.

As shown in FIGS. 1-4, the heat sink 50 has a window portion 78 configured to contact the windshield 16 when the bracket 14 is mounted to the windshield. A camera portion 82 of the heat sink 50 contacts the camera 34 when the camera is in the camera receiving portion 36. An intermediate portion 86 of the heat sink 50 extends between and interconnects the window and camera receiving portions 78, 82.

As shown in FIGS. 1-4, the window portion 78 of the heat sink 50 includes a first conductive body portion 54 of a thermally conductive body 52. The window portion 78 of the heat sink 50 can also include a first resiliently compressible thermal interface material 80, such as an elastomer, on the first conductive body portion 54. The first conductive body portion 54 engages the mounting face 20 of the bracket 14. The first conductive body portion 54 has spaced apart first and second side segments 58, 60. The first side segment 58 engages the first sidewall 26 and the second side segment 50 engages the second sidewall 28. The first conductive body portion 54 thus extends about a periphery 62 of the camera viewing window 24 on at least two sides of the camera viewing window.

The first conductive body portion 54 can also have an end segment 64 that engages the mounting face 20 and is spaced from the camera 34. The end segment 64 of the first conductive body portion 54 extends between and interconnects the first and second side segments 58, 60. In the example configuration of FIGS. 1 and 3, the end segment 64 engages the end wall 32 when the end wall is provided in the body portion 18 of the bracket 14. The end segment 64, however, can engage the bottom wall 30 in configurations of the bracket 14 that do not include the end wall 32. The first side, second side and end segments 58, 60, 64 of the first conductive body portion thus extend about the periphery 62 of the camera viewing window 24 on at least three sides of the camera viewing window.

Although the first side segment 58, the second side segment 60 and the end segment 64 of the first conductive body portion 54 have been shown and described as engaging the first sidewall 26, the second sidewall 28, and the end wall 32 of the bracket 14, the first side segment, second side segment and end segment of the first conductive body portion can be spaced from the first sidewall, the second sidewall, and end wall of the bracket as long as they extend about the camera viewing window 24.

As shown in the example configuration of FIGS. 2-4, the mounting face 20 can have a groove 66 that the first conductive body portion 54 engages. The groove 66 has a first side portion 68 formed in the first sidewall 26, a second side portion 70 formed in the second side wall 28, and an end portion 72 formed in the end wall 32. The first side segment 58 of the first conductive body portion 54 is in the first side portion 58 of the groove 66. The second side segment 60 of the first conductive body portion 54 is in the second side portion 70 of the groove 66. The end segment 64 of the first conductive body portion 54 is in the end portion 72 of the groove 66. The first side, second side, and end segments 58, 60, 64 of the first conductive body portion 54 thus extend in the first side portion 68, the second side portion 70, and the end portion 72 of the groove 66 about the periphery 62 of the camera viewing window 24.

Although the first side portion 68, the second side portion 70 and the end portion 72 of the groove 66 have been shown and described as being formed in the first sidewall 26, the second sidewall 28, and the end wall 32 of the bracket 14, the first side portion, the second side portion and the end portion of the groove can be spaced apart from the first sidewall, the second sidewall, and end wall of the bracket as long as they extend about the periphery 62 of the camera viewing window 24. Further, although the bracket 14 shown in the example configuration of FIGS. 1-4 depict the groove 66 as having an end portion 72 formed in the end wall 32, certain configurations of the bracket include no such end wall. In these configurations, the end portion 72 of the groove 66 can be in the bottom wall 30. The end portion 72 of the groove 66 can be formed in the bottom wall 30 in configurations of the DAS 10 that have the end segment 64 of the first conductive body portion 54 engaging the bottom wall. In configurations of the DAS 10 that do not include the end portion 72 of the groove 66, the first conductive body 54 may not include the end segment 64.

The first thermal interface material 80 of the window portion 78 of the heat sink 50 is configured to contact, such as directly contact, the windshield 16 when the bracket 14 is mounted to the windshield 16. The first thermal interface material 80 thus provides an interface between the first conductive body portion 54 and the windshield 16. The first thermal interface material 80 may be compressed by the windshield 16 as the bracket 14 is secured to the windshield. The compressed first thermal interface material 80 at least partially flattens against the windshield 16 to help ensure contact between the windshield and the heat sink 50. The first thermal interface material 80 can, for example, provide a continuous (i.e., unbroken) interface between the first conductive body portion 54 and the windshield 16 along the lengths of the first side, second side and end segments of the first conductive body portion.

Although the window portion 78 of the heat sink 50 is described and depicted as having the first conductive body portion 54 and the first thermal interface material 80, the window portion can include only the first conductive body portion. In such a configuration, the first conductive body portion 54 can be configured to contact the windshield 16. Alternatively, the first conductive body portion 54 can be spaced from and adjacent to the windshield 16.

As shown in FIGS. 2-4, the camera portion 82 of the heat sink 50 includes a second conductive body portion 56 of the thermally conductive body 52. The camera portion 82 of the heat sink 50 can also include a second resiliently compressible thermal interface material 84, such as an elastomer, on the second conductive body portion 56.

As shown in the example configuration of FIGS. 2-4, the second conductive body portion 56 is spaced apart from the first conductive body portion 54. As shown in the example configuration of FIGS. 3-4, the second conductive body portion 56 is in, such as entirely within, the camera receiving portion 36 of the bracket 14 adjacent to the camera 34. The second conductive body portion 56 is positioned between and engages the camera 34 and a portion of the body portion 18 that defines the camera receiving portion 36. The second conductive body portion 56 can contact a portion of the body portion 18 that defines the camera receiving portion 36.

As shown in FIGS. 3-4, the second thermal interface material 84 contacts, such as directly contacts, the camera 34 when the camera is in the camera receiving portion 36. The second thermal interface material 84 thus provides an interface between the second conductive body portion 56 and the camera 34. The second thermal interface material 84 can, for example, provide a continuous (i.e., unbroken) interface between the second conductive body portion 56 and the windshield 16 along the length of the second conductive body portion.

The second thermal interface material 84 may be compressed by the camera 34 as the camera is positioned in the camera receiving portion 36. The compressed second thermal interface material 84 at least partially flattens against a portion of the camera 34 to help ensure contact between the camera and the heat sink 50.

Although the camera portion 82 of the heat sink 50 is described and depicted as having the second conductive body portion 56 and the second thermal interface material 84, the camera portion can include only the second conductive body portion. In such a configuration, the second conductive body portion 56 can be configured to contact the camera 34. Alternatively, the second conductive body portion 56 can be spaced from and adjacent to the camera 34.

As shown in FIGS. 2 and 4, the intermediate portion 86 of the heat sink 50 includes an intermediate conductive body portion 74 of the thermally conductive body 52. The intermediate conductive body portion 74 extends between and interconnects the first and second conductive body portions 54, 56. The intermediate conductive body portion 74 extends through the body portion 18 of the bracket 14. As shown in the example configuration of FIG. 4, the intermediate conductive body portion 74 can extend through one or more openings 76 in the body portion 18 that extend between the camera receiving portion 36 and the mounting face 20.

As shown in the example configuration of FIGS. 3-4, during use of the DAS 10, the DAS is mounted to the windshield 16. While in use, the camera 34, and/or other electronic components of the DAS 10 in the camera receiving portion 36, generate heat in the camera receiving portion. The thermally conductive body 52 of the heat sink 50 is formed from a material, such as metal, with a higher thermal conductivity than the material that the bracket 14 is formed from, which may be a plastic or polymer. Thus, heat generated in the camera receiving portion 36 is substantially conducted through the heat sink 50 instead of through the bracket 14.

As shown in FIG. 4, the camera portion 82 of the heat sink 50 contacts the camera 34 in the camera receiving portion 36 of the bracket 14. The window portion 78 of the heat sink 50 contacts the windshield 16. The intermediate portion 86 of the heat sink 50 extends through the body portion 18 of the bracket 14 and interconnects the camera and window portions 82, 78. The camera portion 82 of the heat sink 50 conducts heat from the camera 34, and/or other electrical components within the camera receiving portion 36, to the intermediate portion 86. The window portion 78 of the heat sink 50 then conducts heat from the intermediate portion 86 to the windshield 16. Heat generated in the camera receiving portion 36 can also bypass the camera portion 82 and be conducted to the window portion 78 of the heat sink 50 through only the intermediate portion 86.

As described above, the camera's FOV 46 extends through the camera viewing window 24. The first conductive body portion 54 of the heat sink 50 extends about the periphery 62 of the camera viewing window 24, and thus the window portion 78 of the heat sink extends about the camera's FOV 46. The window portion 78 of the heat sink 50 conducts heat generated in the camera receiving portion 36 to an area of the windshield 16 that surrounds the camera's FOV 46, which heats the windshield/FOV intersection 48. Heating the windshield/FOV intersection 48 can prevent fog and/or ice from developing on the windshield 16 at the windshield/FOV intersection, and/or can defog and/or de-ice the windshield at the windshield/FOV intersection.

To help ensure that the heat generated in the camera receiving portion 36 is conducted to the area of the windshield 16 that surrounds the camera's FOV 46, the DAS 10 can include a thermal insulator 88 in the camera receiving portion. The thermal insulator 88 can be formed from one or more materials having a low thermal conductivity, such as an open-cell foam, a closed-cell foam, and/or aerogel. In the example configuration of FIGS. 2-4, the thermal insulator 88 is formed from open-cell or closed-cell foam. As shown in FIGS. 3-4, the thermal insulator 88 contacts and is positioned along portions of the body portion 18 that define the camera receiving portion 36. The camera 34 can be inserted into the thermal insulator 88 as it is inserted into the camera receiving portion 36. The thermal insulator 88, being an open-cell or closed cell foam, is able to compress and permit the camera 34 to be inserted therein. When the camera 34 is provided in the camera receiving portion 36, the thermal insulator 88 is positioned between and contacts the camera and portions of the body portion 18 that define the camera receiving portion. The thermal insulator 88 does not engage the camera portion 82 of the heat sink 50 to permit heat generated by the camera 34 to be conducted through the camera portion.

The thermal insulator 88 insulates the camera receiving portion 36 and limits and/or prevents the loss of heat to the surrounding environment. By insulating the camera receiving portion 36 and limiting or preventing the loss of heat, the thermal insulator 88 helps ensure that heat generated in the camera receiving portion is directed toward the camera portion 82 and/or the intermediate portion 86 of the heat sink 50, and ultimately conducted to the area of the windshield 16 that surrounds the camera's FOV 46.

Although the thermal insulator 88 has been described above as being formed from an open-cell foam, a closed-cell foam, and/or aerogel, the thermal insulator can also, or instead, be one or more gasses having a low thermal conductivity, such as air, argon, and/or krypton, that are maintained within the camera receiving portion 36

Advantageously, the heat sink 50 not only helps prevent fog and/or ice from obstructing the camera's FOV 46, the heat sink can also help avoid thermal damage to the camera 34. Under certain conditions, heat generated by the camera 34 and/or other electrical components in the camera receiving portion 36 can cause thermal damage to the camera if the heat is not dissipated. The heat sink 50 helps to dissipate the heat by conducting the heat generated in the camera receiving portion 36 to the windshield 16, where the heat can be more readily dissipated by, for example, air flow over the windshield, which has a much larger surface area and mass for heat dissipation than the heat sink or the bracket 14. Thus, because of the heat sink 50, the environment of the camera 34 can be cooled or moderated via the windshield 16.

In addition to the above method for cooling the camera 34, the DAS 10 can have additional structures for actively cooling the camera. For example, the heat sink 50 can include one or more cooling fins that radiate heat away from the camera 34 to cool the camera. Alternatively, the DAS 10 can include a liquid-cooling system within the bracket 14. The liquid cooling system can include liquid-cooling lines that transfer heat away from the camera 34 to cool the camera.

Although the heat sink 50 has been described herein as providing a conductive pathway for heat to travel from the camera receiving portion 36 to the windshield 16, the heat sink can instead, or additionally, provide a path of low thermal resistance for heat to transfer from the camera receiving portion to the windshield through one or more heat transfer mechanisms, such as through convection, radiation, conduction, and/or phase transition. For example, the heat sink 50 can function as a heat pipe to transfer heat from the camera receiving portion 36 to the windshield 16 through the use of a liquid contained within an interior cavity of the heat sink. Alternatively, a heat sink 50 having cooling fins can transfer heat that is radiated away from the camera 34 by the cooling fins to the windshield 16. As another alternative, a heat sink 50 having liquid-cooling lines provided at least partially on and/or within the heat sink can transfer heat to the windshield 16 through the liquid-cooling lines.

From the above description of the invention, those skilled in the art will perceive improvements, changes and modifications. Such improvements, changes and modifications within the skill of the art are intended to be covered by the appended claims.

Having described the invention, the following is claimed:

1. A driver assist system for a vehicle, comprising:
    a bracket connectable with a vehicle window having a body portion and a camera viewing window in the body portion, the body portion having a mounting face configured to face the vehicle window, the camera viewing window being defined by spaced apart first and second sidewalls that extend from the mounting face and a bottom wall that interconnects the sidewalls;
    a camera in the body portion having a field of view through the camera viewing window; and
    a heat sink contacting the camera and configured to contact the vehicle window, the heat sink extending about a periphery of the camera viewing window so that heat generated by the camera is transferred through the heat sink to an area of the vehicle window that surrounds the camera's field of view, the heat sink including a window portion configured to contact the vehicle window, the window portion having spaced apart first and second side segments that extend from the camera and an end segment interconnecting the first and second side segments, the first side segment being adjacent to the first sidewall, the second side segment being adjacent to the second sidewall, and the end segment being spaced apart from the camera.

2. The driver assist system recited in claim 1, wherein the heat sink includes a thermally conductive body having a first conductive body portion that extends about the periphery of the camera viewing window, the heat sink including a first resiliently compressible thermal interface material on the first conductive body portion, the first thermal interface material being configured to contact the vehicle window and provide an interface between the first conductive body portion and the vehicle window.

3. The driver assist system recited in claim 2, wherein the thermally conductive body has a second conductive body portion adjacent to the camera, the heat sink including a second resiliently compressible thermal interface material on the second conductive body portion, the second thermal interface material contacting the second conductive body portion and providing an interface between the camera and the second conductive body portion.

4. The driver assist system recited in claim 3, wherein the thermally conductive body has an intermediate conductive body portion that extends through the body portion of the bracket, the intermediate conductive body portion interconnecting the first and second conductive body portions so that heat generated by the camera is conducted to the vehicle window through the second conductive body portion, the intermediate conductive body portion and the first conductive body portion.

5. The driver assist system recited in claim 1, wherein the heat sink includes a first resiliently compressible thermal interface material between and contacting a first portion of the heat sink and the vehicle window and a second resiliently compressible thermal interface material between and contacting a second portion of the heat sink and the camera.

6. The driver assist system recited in claim 1, wherein the camera viewing window is further defined by an end wall that extends from the mounting face away from the vehicle window when the bracket is connected to the vehicle window, the end wall being spaced from the camera and interconnecting the first and second sidewalls, the end segment of the windshield portion being adjacent to the end wall.

7. The driver assist system recited in claim 1, wherein the body portion has a mounting face configured to face the vehicle window, the mounting face having a groove provided thereon, the groove extending about the periphery of the camera viewing window, a portion of the heat sink being in the groove.

8. The driver assist system recited in claim 7, wherein the camera viewing window is defined by spaced apart first and second sidewalls that extend from the mounting face and a bottom wall that interconnects the sidewalls, the groove having a first side portion formed in the first sidewall, a second side portion formed in the second sidewall, and an end portion that interconnects the first and second side portions, a portion of the heat sink being hi the first side, second side and end portions of the groove.

9. The driver assist system recited hi claim 8, wherein the camera viewing window is further defined by an end well that extends from the mounting face away from the vehicle window when the bracket is connected to the vehicle window, the end wall being spaced from the camera and interconnecting the first and second sidewalls, the end portion of the groove being formed in the end wall.

10. The driver assist system recited in claim 9, wherein the heat sink includes a window portion in the groove and extending about the periphery of the camera viewing window, the window portion having a first side segment in the first side portion of the groove, a second side segment in the second side portion of the groove, and an end segment in the end portion of the groove, the end segment of the window portion interconnecting the first and second side segments.

11. The driver assist system recited in claim 1, wherein the body portion has a mounting face configured to face the vehicle window, the body portion defining a camera receiving portion below the mounting face in which the camera is provided, the heat sink including a camera portion contacting the camera in the camera receiving portion and a window portion configured to contact the vehicle window and extending about the periphery of the camera viewing window on the mounting face.

12. The driver assist system recited in claim 11, wherein the heat sink has an intermediate portion extending through the body portion between the camera receiving portion and the mounting face, the intermediate portion of the heat sink interconnecting the camera and window portions so that heat generated by the camera is conducted to the vehicle window through the camera portion, the intermediate portion and the window portion of the heat sink.

13. The driver assist system recited in claim 12, wherein the camera portion conducts heat from the camera to the intermediate portion and the window portion conducts heat from the intermediate portion to the vehicle window.

14. The driver assist system recited in claim 11, further comprising a thermal insulator in the camera receiving portion, the thermal insulator being positioned between and contacting the camera and portions of the body portion that define the camera receiving portion, the thermal insulator directing heat generated by the camera toward the camera portion of the heat sink by insulating the camera receiving portion and limiting and/or preventing the loss of heat to the surrounding environment.

15. The driver assist system recited in claim 1, wherein the body portion defines a camera receiving portion in which the camera is provided, the camera having a lens that extends from the camera receiving portion into the camera viewing window.

16. The driver assist system recited in claim 15, further comprising a thermal insulator in the camera receiving portion, the thermal insulator being positioned between and contacting the camera and portions of the body portion that define the camera receiving portion, the thermal insulator insulating the camera receiving portion to limit end/or prevent the loss of heat generated by the camera to the surrounding environment.

* * * * *